United States Patent [19]

Horn et al.

[11] 4,250,700
[45] Feb. 17, 1981

[54] SHAKER-STRIKER VINE HARVESTER

[75] Inventors: Darrell C. Horn; Gerald L. Claxton, both of Fresno, Calif.

[73] Assignee: Up-Right, Inc., Berkeley, Calif.

[21] Appl. No.: 48,800

[22] Filed: Jun. 15, 1979

[51] Int. Cl.³ ............................................. A01D 46/00
[52] U.S. Cl. .................................. 56/330; 56/328 TS
[58] Field of Search ........................... 56/330, 328 TS

[56] References Cited

U.S. PATENT DOCUMENTS

| | | | |
|---|---|---|---|
| 3,187,493 | 6/1965 | Harrett | 56/330 |
| 3,439,482 | 4/1969 | Orton | 56/330 |
| 3,727,388 | 4/1973 | Smith | 56/330 |
| 3,827,222 | 8/1974 | Toti | 56/330 |
| 4,016,711 | 4/1977 | Claxton | 56/330 |
| 4,172,352 | 10/1979 | McCarthy et al. | 56/328 TS |
| 4,179,871 | 12/1979 | Claxton | 56/330 |

*Primary Examiner*—Paul J. Hirsch
*Attorney, Agent, or Firm*—Phillips, Moore, Weissenberger, Lempio & Majestic

[57] ABSTRACT

A mechanical grape harvester for trellis-supported grape vines having relatively rigid shaker members for engaging and shaking the rigid trunk structure of the vine and having relatively flexible striker rods for striking against the limber portions of the vine growth trained along the trellis wire. The shaker members and striker rods are both operated at minimal speeds to reduce leaf removal and plant damage.

10 Claims, 6 Drawing Figures

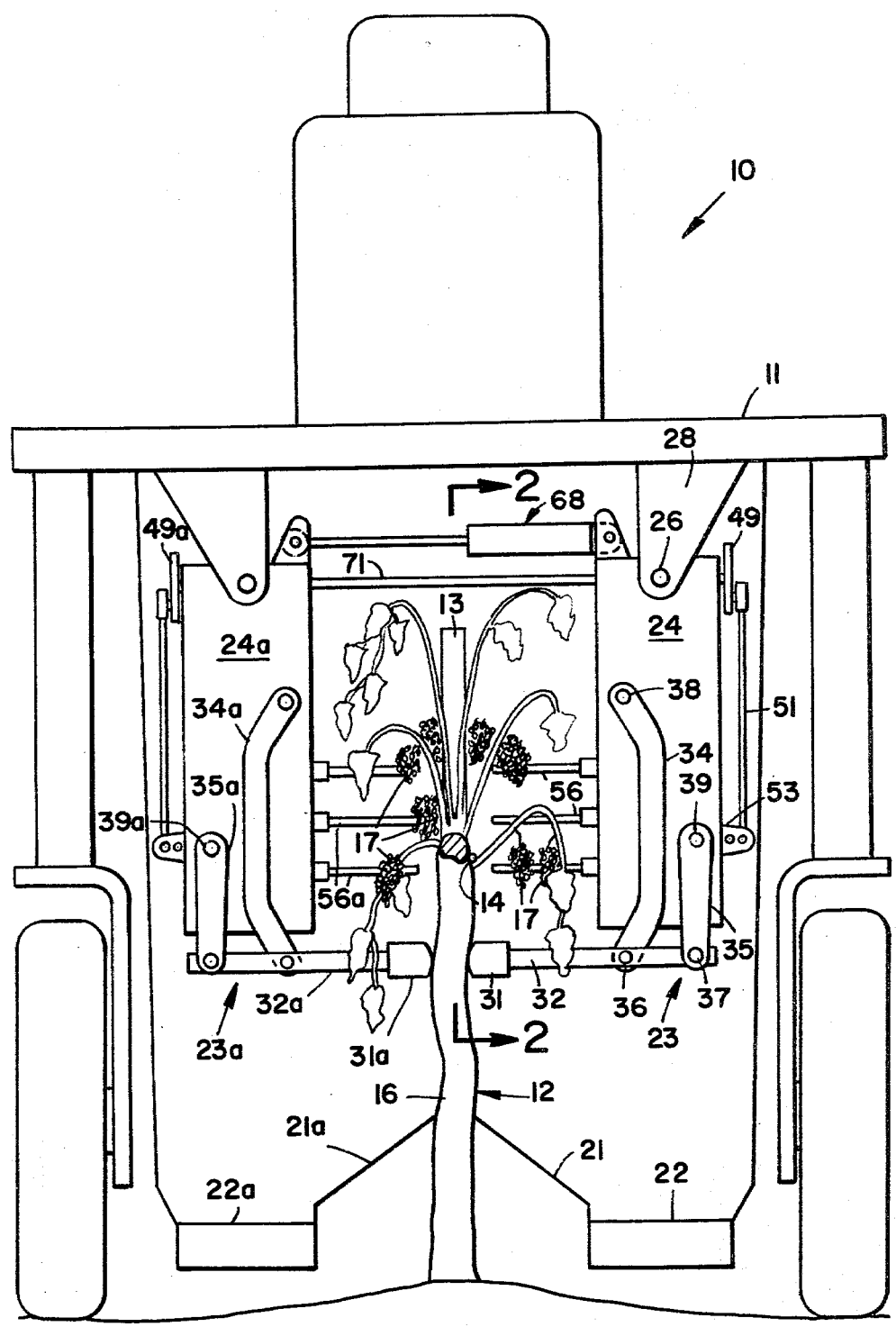
FIG _ 1

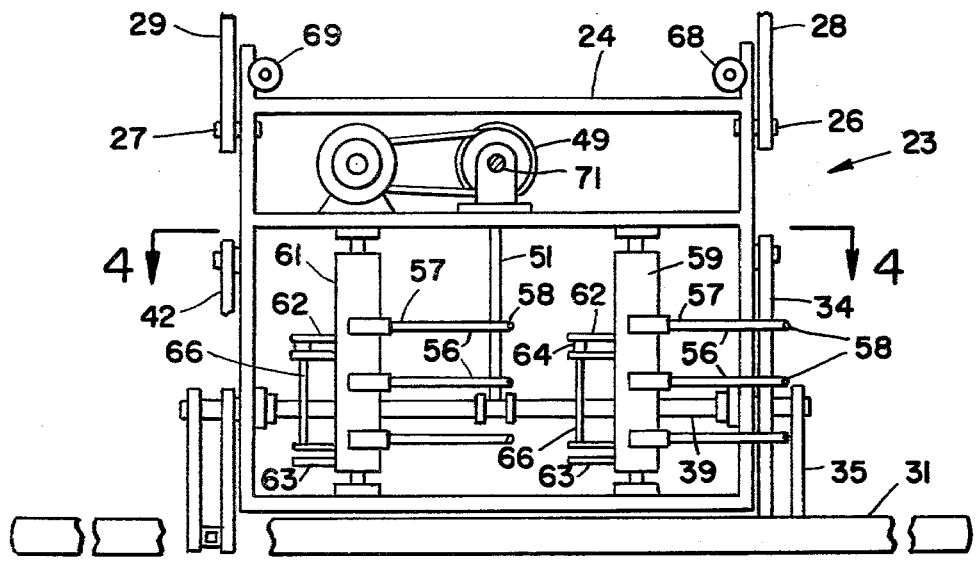
FIG_2
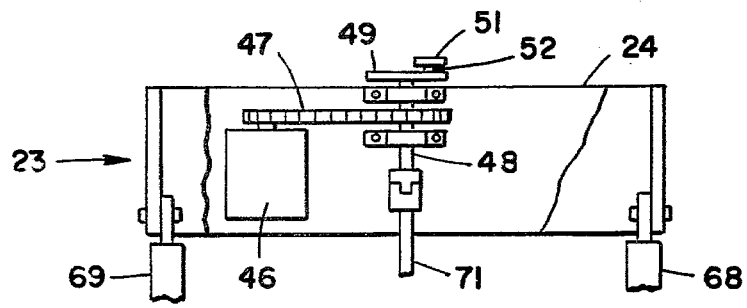
FIG_3
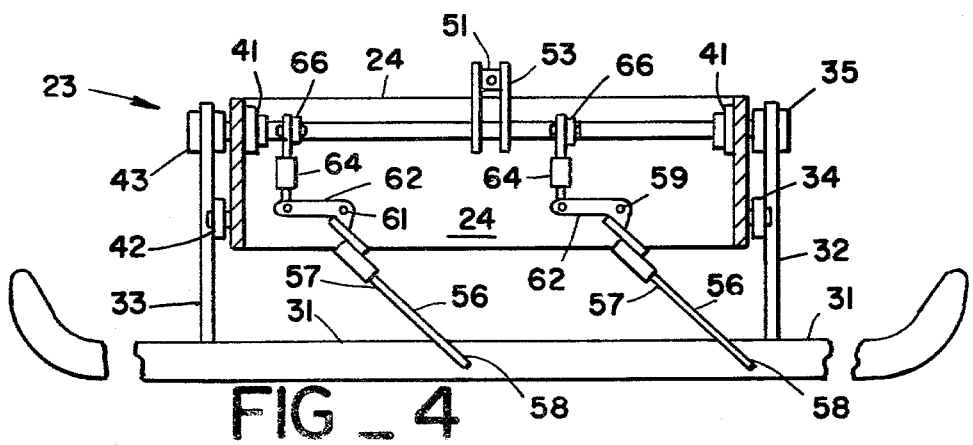
FIG_4

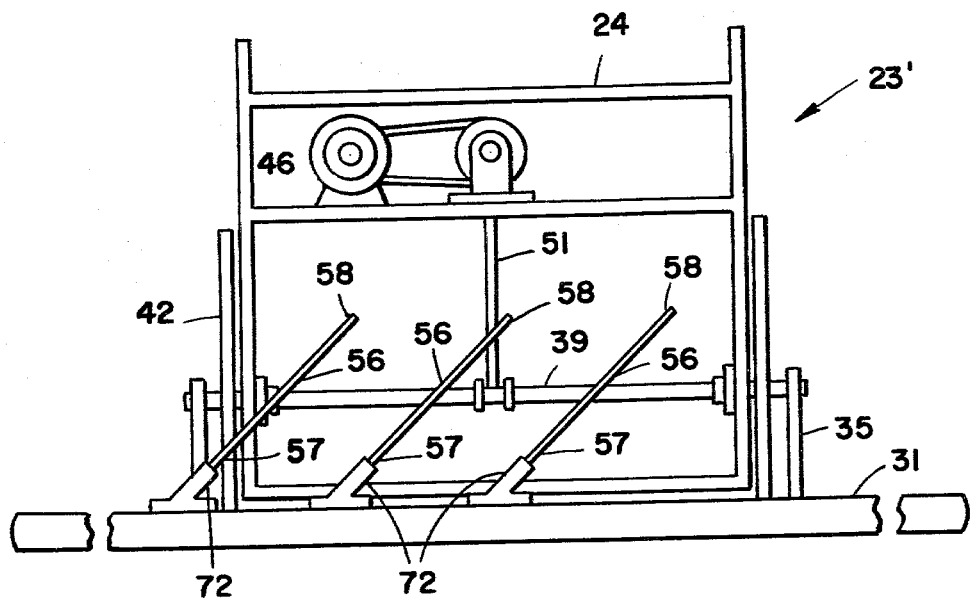
FIG _ 5
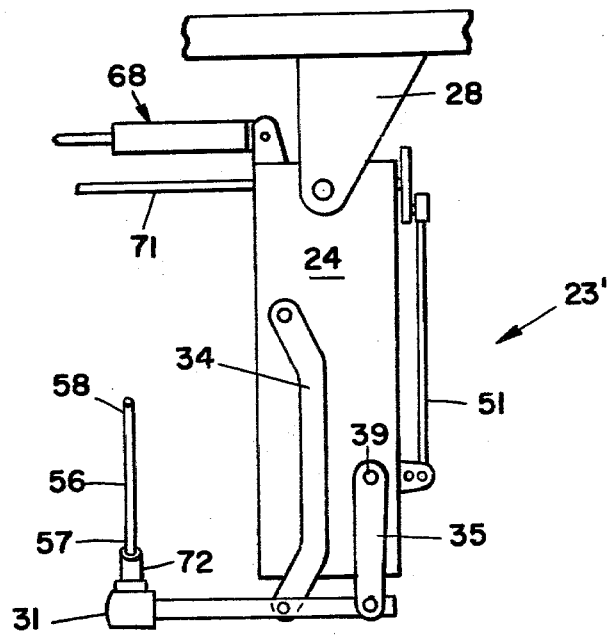
FIG _ 6

SHAKER-STRIKER VINE HARVESTER

BACKGROUND OF THE INVENTION

This invention relates to the mechanical harvesting of trellis-supported grapevines.

A typical vineyard consists of a series of rows of stakes which in turn support an arrangement of horizontal trellis wires running along each row, forming a trellis system to provide support for the individual grape vine growth and the attendant fruit thereon. A generally vertical vine trunk will be typically located at each stake with vine growth trained longitudinally on and along the wire structure. The layout of the modern vineyard is relatively standarized with about 500 vines per acre.

There are two types of training which predominate. One, cordon training, requires that the longitudinal vine growth be fastened to the wire securely where it will remain for many years. The fruit is borne on wood which was originally grown the previous year, so with this type training the year's growth is cut back almost to the cane trained on the wire, i.e., the cordon. These short, carefully selected "spurs" will produce a crop the following year and must be replaced each year from growth along the cordon. The other, cane training, also uses a vine (cane) fastened to the wire as in cordon training but the canes used are replaced each year from new growth out of the head of the vine, i.e., the area immediately above the trunk where the growth branches out. In either case the wood which actually bears fruit is replaced each year by wood grown the previous year. If this new growth is damaged or removed during harvesting, then that wood will not be available for production the following year and the yield from that vine will decrease substantially. Additionally, damage to such growth will expose the plant to serious injury from fungus and insects.

The major fruit bearing area will begin at the base of the fruiting wood next to the trellis wire and extend outward. The actual fruit production will vary quite considerably depending on the specific variety, the geographical location of the field and the age of the vine. This production will vary from a few pounds per vine for a young low yielding variety to 100-120 pounds per vine for an older, heavier bearing variety. The pruning of the vine controls to a large extent the actual location of the fruiting area. It is generally desired not to have the fruit growing in tight clusters in a congested area since the fruit cannot be covered effectively then by the fungicides and insecticides which are an essential part of modern viticulture. Although fruit production in the vicinity of the head of the trunk is minimized by pruning practices, there will still be 10-15% of the total production in those areas. The trunk area of the vine is quite rigid, the cordon area is somewhat less rigid and the fruiting wood is more and more flexible with increasing distance from the cordon and trellis wire. The fruiting area of the vine is quite extensive on the heavier yielding varieties and may extend two feet or more outwardly from the trellis wire. The large amount of fruit produced also results in the extensive vine and leaf growth which is essential to provide the nutrients for fruit production.

All successful harvesting mechanism to date have been based on some means of agitating or shaking the vines and fruit to cause detachment of the fruit. The ease of removal the fruit varies considerably. Some varieties are easily removed, some have a very tenacious connection to the stem. Some varieties have a tough, hard-to-damage berry and some have a very delicate, easily damaged berry. The actual mode of fruit removal on present mechanisms also varies. Some machines directly contact the fruit to cause detachment of the berries and bunches. Other machines use a shaking action which attempts to remove the fruit by causing relative motion between the fruit and the vine and by using the inertia of the fruit to break it loose.

The mechanism in use in the majority of grape harvesting machines today utilizes a series of striker rods which oscillate into and out of the foliage to dislodge the fruit largely by direct contact. Typically, four banks of 3-foot long, ⅜-inch diameter fiberglass rods are positioned in vertical planes with the rods being oscillated horizontally about their forward ends so that the free ends of the rods move towards and away from the vine growth to strike the grapes off of the vines. Since actual contact is the major mode of removal the entire vine structure must be struck repeatedly until the rods have penetrated the foliage completely enough to remove all of the fruit.

The striker rod system of harvesting has a serious disadvantage in that it requires a high rate of approximately 400-450 cycles per minute of striker rod operation to remove the fruit from the vine growth in the vicinity of the head of the trunk. This area of fruit growth is very congested with permanent vine arms which protect the fruit. Also, in vineyards where a trellis stake is placed at each vine trunk, the stake also congests this area, making it difficult to remove the fruit with striker rods and thus requiring an excessive rate of operation to beat the fruit off. This high rate of operation results in significant breakage of canes and removal and shredding of leaves along with the fruit. Some of the white varieties such as french colombard and chenin blanc (which are represented by large plantings) experience an objectional deterioration in quality. Even with special handling the presence of the shredded leaves mixed with the fruit can cause the formation of aldehydes which gives the wine an "off" flavor. Additionally, the damage to the vine can cause lessening of the productivity in following years and an increased susceptibility of the vine to diseases.

The area along the row between the vine trunks, however, is much easier to pick by striker rods and a lower rate of striker rod operation is required to remove the fruit because the fruit is hanging relatively free without the congestion of permanent vine arms and trellis stakes. However, it is not possible to adjust the rate of striker rod operation to pick the fruit at the exact minimum rate as the harvester is progressing rapidly down the row. As a consequence the machine operator has no choice but to have the striker rods operate at a constant speed and at the high rate needed to remove the fruit from the vicinity of the trunks. The result is that the foliage and fruit in the areas between the trunks is beaten at excessive rates, causing vine and leaf damage similar to that in the vicinity of the trunks.

There has been some work in recent years on a system for shaking the vine trunks and trellis system to remove the fruit. In particular, this system uses opposed shaker members which engage the vine trunk and/or trellis parts therebetween and shake them horizontally back and forth so that the inertia of the fruit will cause the fruit to be dislodged from the shaking vine.

The trunk shaking method has had excellent results in that much less damage is caused to the vine growth along the trellis wire and much less leaves are removed with the grapes.

However, the trunk shaking method has a considerable drawback in that the overall efficiency of harvesting is not as high as with the striker rod systems. In the vicinity of the head of the trunk and harvesting efficiency is quite high since the transfer of the shaking energy from the trunk and trellis part to that area is quite good. The energy transfer to the remoter areas of the vine growth will be less and less, depending on the resiliency of the vine growth trained along the trellis wire. Some varieties, such as zinfandel, tend to have a great deal of vine growth at the end of the permanent cordon which is sometimes 2½ to 3½ feet away from the head of the trunk and a heavy fruit load thereat. In order to harvest the fruit at these remote areas by the trunk-shaking system, the system must operate at high energy levels and in such manner that sufficient energy is transferred away from the trunk vicinity to the remotely located fruit.

Attempts have been made to operate the shaker type harvesters at a low ground speed so that each trunk is shaken for a longer time. This does increase the amount of fruit removal. However, this results in an uneconomically slow harvest speed. Harvest speed is very important as the fruit must be harvested at the peak of ripeness when the sugar-acid ratio is at the desired level. This peak point can last less than a week during which time the fruit must be totally harvested. Grapes have the characteristic, unlike some fruits and vegetables, that a particular variety in a specific geographical location will usually ripen at the same time over each vine and each field.

In order to harvest grapes by the trunk shaking system with a good harvesting efficiency and acceptable speed, it has been necessary to operate these systems at a high rate, typically 400–425 cycles per minute and with a relatively high shaking stroke. Unfortunately, this often causes the trunks to split where they branch off into the cordons and/or causes breakage of the trellis posts.

Further, there are several trellis-supported vine systems which are not adapted to be harvested by trunk-shaking systems. For example, in vineyards wherein the vines are trained so that there are only one-year old canes trained along the trellis wire, the canes are usually too limber to transfer sufficient shaking energy therealong to cause fruit removal. The same is true in cordon trained vineyards wherein the cordons are still young and quite flexible. In some areas with some varieties, there is a practice of leaving a lateral (referred to as a "kicker" cane) extending from the end of the cordon up to and attached to the top foliage wire of the trellis system, the kicker cane being used to secure the end of the cordon so that it will not twist and roll over as the vine grows or as the wind blows and puts a bending force on the upwardly growing foliage. The kicker cane also results in more fruiting buds on the vine and thus increase the crop. However, because the kicker cane is quite limber and carries fruit at a location away from the trellis wire, such fruit cannot be effectively harvested by a trunk-shaking system.

As is apparent from the foregoing, there is a need for a mechanical grape harvesting machine which is usable for any standard trellis-trained grape system, which is operable at commercially acceptable ground speeds, which has a high harvesting efficiency, which has low leaf removal and which causes minimal damage to the vine growth, trunks and trellis parts.

STATEMENT OF THE INVENTION

The present invention is directed towards overcoming one or more of the problems and filling the need set forth above.

In the main aspect of the present invention, relatively rigid shaker members and relatively resilient striker rods are moved together down a row of trellis-trained grape vines, with the shaker members being used to engage and shake the vine trunks and the striker member being used to strike against the vine growth trained along the trellis wire. The cooperation of the shaker members and striker rods in the removal of fruit enables them to be operated at considerably reduced rates of movement so that leaf removal, vine growth damage, trunk damage and trellis post breakage is substantially reduced.

Other aspects of the invention will become apparent in the course of the following detailed description.

BRIEF DESCRIPTION OF THE DRAWINGS

In the drawings, forming a part of this application and in which like parts are designated by like reference numerals throughout the same, FIG. 1 is a rear elevational view of a harvesting machine constructed in accordance with the present invention;

FIG. 2 is an elevational view of one of the picking heads of the harvesting machine, as seen from line 2—2 of FIG. 1;

FIG. 3 is a top plan view of the picking head of FIG. 2, with portions broken away;

FIG. 4 is a sectional view of the picking head of FIG. 2, taken on line 4—4 thereof;

FIG. 5 is an elevational view, similar to FIG. 2 showing a picking head with a modified embodiment of the invention;

FIG. 6 is an end elevational view of the picking head of FIG. 5.

DESCRIPTION OF THE PREFERRED EMBODIMENTS

Referring now to the drawings, wherein are disclosed preferred embodiments of the invention, FIG. 1 illustrates a mechanical grape harvester 10 having a wheeled frame 11 adapted to straddle and move along a row of trellis-supported grape vines 12, with the longitudinal centerline of the harvester generally centered on the row. As is conventional, trellis posts 13 are spaced apart in a row, with a horizontal trellis wire 14 secured to the posts and extending along the length of the row. Typically the vines will be planted at each post, the vines having a generally vertical trunk 17 and cordons (or canes) 17 trained along the trellis wire in both directions from the trunk so that the vine growth and grapes 18 thereon will have the trellis wire centrally thereof.

As is conventional, the harvester 10 has fruit catchers 21,21a and conveyors 22,22a suspended from the frame 11 to catch the harvested fruit and convey it to suitable fruit collection apparatus (not shown).

The improvement of the present invention resides in the picking heads 23 and 23a which are carried by frame 11. Since the two picking heads 23 and 23a are mirror images of each other, only picking head 23 is shown and described herein in detail, it being understood that the description of the elements of picking head 23 will apply equally to the corresponding elements (having the same reference numeral applied thereto but with the subscript "a") of picking head 23a.

As best seen in FIGS. 1 and 2, picking head 23 has a generally box-shaped subframe 24 pivotally supported at its upper end, as by pins 26 and 27 to brackets 28 and 29 which are fixed to the main wheeled frame 11.

Picking head 23 includes a relatively rigid shaker member 31, preferably an elongaged and horizontal ski, disposed parallel to the longitudinal centerline of the machine, the ski 31 being supported on the subframe 24 by a four bar linkage so that the ski can swing back and forth towards and away from the longitudinal centerline of the harvester. As illustrated, the ski 31 has horizontal support arms 32 and 33 secured thereto and extending outwardly therefrom. Links 34 and 35 are pivotally connected at 36 and 37, respectively, to support arms 32 and link 34 is pivotally connected at 38 to subframe 24. Link 35 is keyed to horizontal shaft 39 which is rotatably journaled in bearings 41. Links 42 and 43 are similarly disposed at the other end of subframe 24 and connected to support arm 33, with link 43 being also keyed to shaft 39.

Shaft 39 is oscillated about its longitudinal axis by operation of a hydraulic motor 46 which is connected by chain 47 to drive shaft 48 for rotation of eccentric 49. Connecting rod 51, connected at its upper end to eccentric 49 at a point 52 thereon offset from the axis of shaft 48 and connected at its lower end to crank arm 53 keyed to shaft 39 will thus oscillate shaft 39 through a fixed arc and move the shaker ski 31 through a fixed stroke towards and away from the longitudinal centerline of the harvester for each revolution of the motor-driven shaft 48. Preferably the distance from the axis of shaft 39 to the connection of connecting rod 51 to crank arm 53 can be changed so that the stroke of the shaker ski 31 can be varied.

The picking head 23 also carries a plurality of relatively resilient (preferably fiberglass) striker rods 56 therewith, each rod having a held end 57 and a free end 58, the free ends of the rods being adapted to strike against the vine growth trained along the trellis wire. As shown in FIGS. 1–4, the striker rods 56 are horizontally disposed with their held ends 57 fixed to vertical striker rod support shafts 59 and 61 which are mounted on subframe 24 for oscillation about the vertical axes thereof. The striker rods 56 extend inwardly and rearwardly towards the longitudinal centerline of the harvester. Each striker rod support shaft preferably has upper and lower crank arms 62 and 63 fixed thereto. An adjustable length connecting rod 64 connected between crank arm 66 on shaft 39 and one of the crank arms 62 or 63 on the striker rod support shafts 59 and 61 will cause the support shafts to oscillate through a fixed arc in response to operation of motor 46 and oscillation of shaft 39. Such movement will move the held ends of the striker rods so that the free ends thereof move through a fixed stroke towards and away from the longitudinal centerline of the harvester. Adjustment of the lengths of connecting rods 64 will adjust the inwardmost excursion of the free ends of the striker rods relative to the centerline of the machine. If desired, one of the connecting rods 64 can be connected between the lower crank arm 63 on one of the striker rod support shafts and the lower end of crank 66 or shaft 39 so that the striker rods on the two support shafts 59 and 61 will move 180° out of phase with each other.

By virtue of the above described drive connections, the number of times per minute that the shaker ski 31 will move back and forth is equal to the number of times per minute that the striker rods 56 are moved back and forth.

The two picking heads 23 and 23a are interconnected by hydraulic rams 68 and 69 and a constant hydraulic pressure is applied to these rams to extend the rams and move the shaker skis 31 and 31a together so that they engage and press against a vine trunk 76 and/or post 13 therebetween with a desired force. With a constant hydraulic pressure applied, the shaker skis can yield apart from each other to accomodate themselves to varying thickness of vine trunks.

The two picking heads 23 and 23a are also interconnected by a timing shaft 71 connected to drive shaft 48 of picking head 23 and the corresponding motor-driven drive shift of picking head 23a. Such timing shaft functions to synchronize the operation of the two picking heads so that the two shaker skis 31 and 31a will move leftwardly and rightwardly (as viewed in FIG. 1) in unison with each other. Similarly, the pivotal movement of striker rods 56 will be synchronized with the pivotal movement of striker rods 56a.

Turning now to the embodiment shown in FIGS. 5 and 6, picking head 23' differs from the picking head 23 described above in that the striker rods 56 are mounted with their held ends 57 fixed in rod supports 72 spaced along the length of the shaker ski 31, the rods extending upwardly and rearwardly or the machine and generally in a vertical plane. The shaker ski 31 is driven towards and away from the longitudinal centerline of the harvester by motor 46 as before, and the striker rods 56 are translated therewith so that the free ends 58 of the striker rods move towards and away from the longitudinal centerline of the harvester to strike against the vine growth trained along the trellis wire. This embodiment has the advantage of a simpler drive mechanism, but the obtainable stroke of the striker rods will be limited by the stroke of the shaker ski. The stroke of the free ends of the striker rods will, of course, be greater than the stroke of the shaker ski because of the resilience of the striker rods.

Operation

The picking heads disclosed herein can be installed in any of the commercially available grape harvesters which straddle vines for the harvesting thereof, in substitution for the picking heads previously used therewith.

As mentioned previously, the striker rods picking heads heretofore used have been operated in the range of 400–450 cycles per minute and the trunk-shaking picking heads have been operated in the range of 400–425 cycles per minute.

Tests which have been conducted show that while striker rod picking heads must be operated in a range of from 400–450 cycles per minute in order to harvest grapes from the congested area in the vicinity of the head of the trunks, operation in the range of 325–350 cycles per minute will be sufficient to harvest the grapes from the areas away from the trunks. Tests also show that while trunk shaking picking heads must be operated in a range of from 400–425 cycles per minute in order to harvest grapes with sufficient efficiency from the full length of the vine, operation in the range of 325–350 cycles per minute will harvest grapes quite efficiently in the area in the vicinity of the heads of the trunks where the relatively rigid trunk and vine structure provides a high degree of transfer of the shaking energy to the fruit bearing vine growth thereat.

With the present invention, concurrent operation of the shaker members 31 and 31a and the striker rods 56 and 56a at a rate of 300–350 cycles per minute, as the harvester travels down a row of vines at a commercially acceptable ground speed, will result in harvesting substantially all of the grapes from the vine through the cooperation of the shaker members and striker rods, which act together to provide a more complete harvesting coverage of the vine structure, with the shaker members 31 and 31a harvesting the grapes which the striker members have difficulty in harvesting, and vice versa. This cooperation will take place along the length of the row. In the vicinity of the head of the trucks, most of the grape will be removed by the shaking action of the shaker member 56 and 56a. However, even in that area, there will be some relatively freely dangling bunches of grapes that are difficult to dislodge by the shaker member alone. Such bunches will be outwardly from the trellis wire and will be easy to harvest by the striker rods. At areas along the trellis wire remote from the head of the trunk, the shaking action of the shaker member will be considerably dissipated, but will still be effective to dislodge grapes growing close to the trellis wire. The striker rods accordingly need not penetrate as deeply into the vine growth as they would have to by striker rod harvesting alone.

Accordingly, the speed of the hydraulic motors 46 and 46a is set for the particular vineyard to be harvested so that the rate of shaking and striking is substantially less than that required for trunk-shaking or striker rod striking alone and is just sufficient for the desired efficiency of harvesting.

Operation of the harvester at the substantially lower rates of shaking and striking produces many beneficial results. Since less shaking and striking energy is imparted to the trunk and vine growth, there will be a considerable reduction in vine damage. This, in turn, results in healthier vines after harvest, with no drop off in production and less need for spray application to protect and strengthen the vines. A premium quality harvest will also result, with considerably less bruised or split grapes.

The lower shaking forces will also result in less trellis damage, with fewer broken stakes, less staple removal (staplers are detrimental to winery machinery), and less loosening of the wire and cordon structure.

The lower force levels used will increase the life of the harvesting machine life and reduce the time lost due to breakdown.

As mentioned above, deep penetration of the striker rods into the vine growth is not required. This reduces the amount of damage to the more rigid portions of the vine growth near the cordon and also reduces the amount of leaf removal and fragmentation. Additionally, since the striker rods are impacting chiefly against resilient vine growth, striker rod breakage is sharply reduced.

With any system of mechanical harvesting, there is a relation between the rate of shaking or striking and the ground speed of the harvester. In general, the higher the ground speed, the greater must be the shaking or striking rate to obtain the desired harvesting efficiency. As a consequence, the top permisable ground speed of a harvester is substantially determined by the amount of damage that can be tolerated by the harvesting action.

As is apparent, since for any given ground speed the present invention enables a considerably lower rate of vine and trellis agitation to be used, harvesting can now be accomplished more quickly with incrased ground speed and still with reduced damage as compared to presently used mechanical harvesters.

We claim:

1. A method of harvesting grapes from a row of trellis-supported grape vines having vertical trunks spaced apart along the row and vine growth extending from said trunks and trained along a horizontal trellis wire extending along said row, the method comprising:

moving along said row with relatively rigid shaker members and relatively flexible striker rods, engaging the trunks with said shaker members at a level below said trellis wire and moving said shaker members back and forth transversly to said row to shake the engaged trunks while moving down the row, holding each of said striker rods at one end thereof and repeatedly moving the free ends thereof towards and away from said row to strike repeatedly against and impart striking energy to the vine growth trained along said trellis wire while moving down the row.

2. A method of harvesting grapes as set forth in claim 1, and further including:

moving the shaker members back and forth at a predetermined number of cycles per minute and moving the free ends of the striker rods towards and away from the vine growth at the same number of cycles per minute.

3. A method of harvesting grapes as set forth in claim 2, and further including:

moving the shaker members back and forth continuously as the shaker members are moved along said row and moving the free ends of the striker rods towards and away from the vine growth continuously as the striker rods are moved along said row.

4. A method of harvesting grapes as set forth in claim 1, and further including:

shaking said trunks by said shaker members at a rate substantially less than that needed to remove grapes from the vine growth remote from the trunks by trunk shaking alone, striking the vine growth with said striker rods at a rate substantially less than that needed to remove grapes from the vine growth in close proximity to the trunks by striker rod striking alone.

5. A method of harvesting grapes as set forth in claim 4 and further including:

shaking said trunks by said shaker members at a predetermined number of cycles per minute and striking said vine growth with said striker rod at the same number of cycles per minute.

6. A method of harvesting grapes as set forth in claim 4 and further including:

continuously and concurrently shaking said trunks and striking said vine growth while moving along said row.

7. A harvesting machine for harvesting grapes from a row of trellis-supported grape vines having vertial trunks spaced apart along the row and vine growth trained along a horizontal wire extending along said row, said harvesting machine comprising:

a wheeled frame adapted to straddle and move along said row with the longitudinal centerline of said frame being in alignment with the length of said row, relatively rigid shaker members carried by said frame below the level of said trellis wire and movable towards and away from the longitudinal centerline of said frame for shaking engagement with the trunks of said plants, relatively flexible striker rods carried by said frame, said rods each having a held end and a free end, said free ends of said striker rods being above said shaker members and being movable towards and away from the longitudinal centerline of said frame for engagement with the vine growth of said vines, means for repeatedly moving said shaker members horziontally towards and away from said longitudinal centerline to impart shaking energy to said trunks and for moving the held ends of said striker rods to move the free ends thereof horizontally towards and away from said longitudinal centerline to impart striking energy to said vine growth.

8. A harvesting machine as set forth in claim 7, wherein said means for moving said shaker members and said striker rods has the further function of moving said shaker members and striker rods continuously and concurrently, with the shaker members and striker rods each being moved at the same number of cycles per minute.

9. A harvesting machine as set forth in claim 7,
wherein said shaker members comprise a pair of elongated, parallel and horizontal skis, one on each side of the longitudinal centerline of said frame,
wherein said frame has a pair of vertical shafts carried thereby, one on each side of said longitudinal centerline, for oscillating movement about the vertical axes of said shafts, and
wherein said striker rods are generally horizontal with their held ends being fixed to said shafts.

10. A harvesting machine as set forth in claim 7,
wherein said shaker members comprise a pair of elongated, parallel and horizontal skis, one on each side of the longitudinal centerline of said frame, and
wherein said striker rods extend upwardly from said skis with the held ends of said striker rods being fixed to said skis at spaced apart points therealong.

* * * * *